United States Patent
Law et al.

(10) Patent No.: US 10,059,159 B2
(45) Date of Patent: Aug. 28, 2018

(54) ALL-TERRAIN VEHICLE HITCH

(71) Applicants: Park Walter Law, Clarkston, WA (US); Bradley Dean Alboucq, Clarkston, WA (US)

(72) Inventors: Park Walter Law, Clarkston, WA (US); Bradley Dean Alboucq, Clarkston, WA (US)

( * ) Notice: Subject to any disclaimer, the term of this patent is extended or adjusted under 35 U.S.C. 154(b) by 0 days.

(21) Appl. No.: 15/693,431

(22) Filed: Aug. 31, 2017

(65) Prior Publication Data
US 2018/0056737 A1     Mar. 1, 2018

Related U.S. Application Data

(60) Provisional application No. 62/382,299, filed on Sep. 1, 2016.

(51) Int. Cl.
*B60D 1/14*     (2006.01)
*B60D 1/02*     (2006.01)
*B60D 1/00*     (2006.01)

(52) U.S. Cl.
CPC ............... *B60D 1/14* (2013.01); *B60D 1/02* (2013.01); *B60D 1/025* (2013.01); *B60D 2001/001* (2013.01)

(58) Field of Classification Search
CPC ....... B60D 1/14; B60D 1/02; B60D 2001/001
See application file for complete search history.

(56) References Cited

U.S. PATENT DOCUMENTS

| | | | | |
|---|---|---|---|---|
| 1,557,841 A | * | 10/1925 | Holmes | B60D 1/02 280/494 |
| 2,221,278 A | * | 11/1940 | Utterback | B60D 1/02 280/492 |
| 3,730,557 A | * | 5/1973 | Cox | B60D 1/02 280/492 |
| 4,548,423 A | * | 10/1985 | Craven | B60D 1/00 280/204 |
| 4,711,461 A | * | 12/1987 | Fromberg | B60D 1/02 280/494 |
| 5,186,483 A | * | 2/1993 | Sheppard | B60D 1/00 280/492 |
| 5,722,678 A | * | 3/1998 | Hunger | B60D 1/02 172/248 |
| 5,765,851 A | * | 6/1998 | Parent | B60D 1/143 280/491.1 |
| 6,203,049 B1 | * | 3/2001 | Gibson | A01B 59/042 280/494 |
| 6,877,758 B2 | * | 4/2005 | Colistro | B60D 1/075 180/14.4 |
| 6,902,182 B1 | * | 6/2005 | Kamunen | B60D 1/145 180/908 |
| 7,938,431 B1 | * | 5/2011 | Snyder | B60D 1/01 280/491.5 |
| 7,988,178 B2 | * | 8/2011 | Shockley | B60D 1/06 280/446.1 |

(Continued)

*Primary Examiner* — Tony H Winner
*Assistant Examiner* — Michael R Stabley
(74) *Attorney, Agent, or Firm* — Romney J. Hogaboam

(57) ABSTRACT

An all-terrain vehicle hitch comprising two revolute joints connected by a hinge joint and means for attaching the hitch to both a vehicle and trailer. The hitch is elevated above the axels of both the vehicle and trailer and allows the trailer to rotate relative to the vehicle.

11 Claims, 4 Drawing Sheets

(56) References Cited

U.S. PATENT DOCUMENTS

| | | | | |
|---|---|---|---|---|
| 8,096,571 B1* | 1/2012 | Noe | ........................ | B60D 1/02 |
| | | | | 180/53.4 |
| 8,118,323 B2* | 2/2012 | Hudson | .................... | B60D 1/00 |
| | | | | 280/494 |
| 8,408,576 B2* | 4/2013 | Volk | ........................ | B60D 1/01 |
| | | | | 280/293 |
| 9,283,822 B1* | 3/2016 | Krapf | ....................... | B60D 1/24 |
| 9,802,450 B2* | 10/2017 | Mathews | ................. | B60D 1/01 |
| 2001/0026060 A1* | 10/2001 | Cross | ..................... | B60D 1/155 |
| | | | | 280/456.1 |
| 2004/0061309 A1* | 4/2004 | Shoffner | ................. | B60D 1/00 |
| | | | | 280/494 |
| 2007/0235982 A1* | 10/2007 | Cumbie | ................ | B60D 1/155 |
| | | | | 280/478.1 |
| 2012/0007337 A1* | 1/2012 | McGinnes | ............... | B60D 1/02 |
| | | | | 280/456.1 |

\* cited by examiner

ALL-TERRAIN VEHICLE HITCH

CROSS-REFERENCE TO RELATED APPLICATIONS

This application claims priority to provisional patent application 62/382,299 filed on Sep. 1, 2016.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A "SEQUENCE LISTING," A TABLE, OR A COMPUTER PROGRAM LISTING APPENDIX SUBMITTED ON COMPACT DISC AND AN INCORPORATION-BY-REFERENCE OF THE MATERIAL ON THE COMPACT DISC

Not Applicable

STATEMENT REGARDING PRIOR DISCLOSURES BY AN INVENTOR OR JOINT INVENTOR

Not Applicable

BACKGROUND OF THE INVENTION

This invention relates generally to an apparatus for attaching a trailer to a vehicle.

For a long time, people have sought to increase their capacity to transport people and objects. This desire, and solutions to address it, significantly predates mechanized vehicles and involved technology such as wagons and travois. Trailers are commonplace and increase the amount which can be transported while decreasing the ground pressure by spreading the weight over a greater number of wheels and surface area. For example, a trailer having a gross weight in excess of a few tons may be configured to have a tongue weight of a few hundred pounds thus greatly easing transport.

There are a number of conventional mechanisms for attaching vehicles to trailers. These mechanisms include, but are not limited to, a tow ball, a three point hitch, a pintle hook, a draw bar, and a goose neck. Each mechanism has certain advantages. Desirable features in vehicle-trailer attachment mechanisms include, without limitation, low weight, high strength, weight transfer to an advantageous location, and a high degree of rotational freedom.

BRIEF SUMMARY OF THE INVENTION

The invention is an attachment mechanism with particular application to all-terrain vehicles comprising two revolute joints connected by a hinge joint. The joints are elevated above the conventional hitch attachment location with a generally vertical member between the joints and the vehicle attachment point. The joints are connected to the trailer by a goose neck or angled tongue.

DETAILED DESCRIPTION OF THE INVENTION

Figure 1:
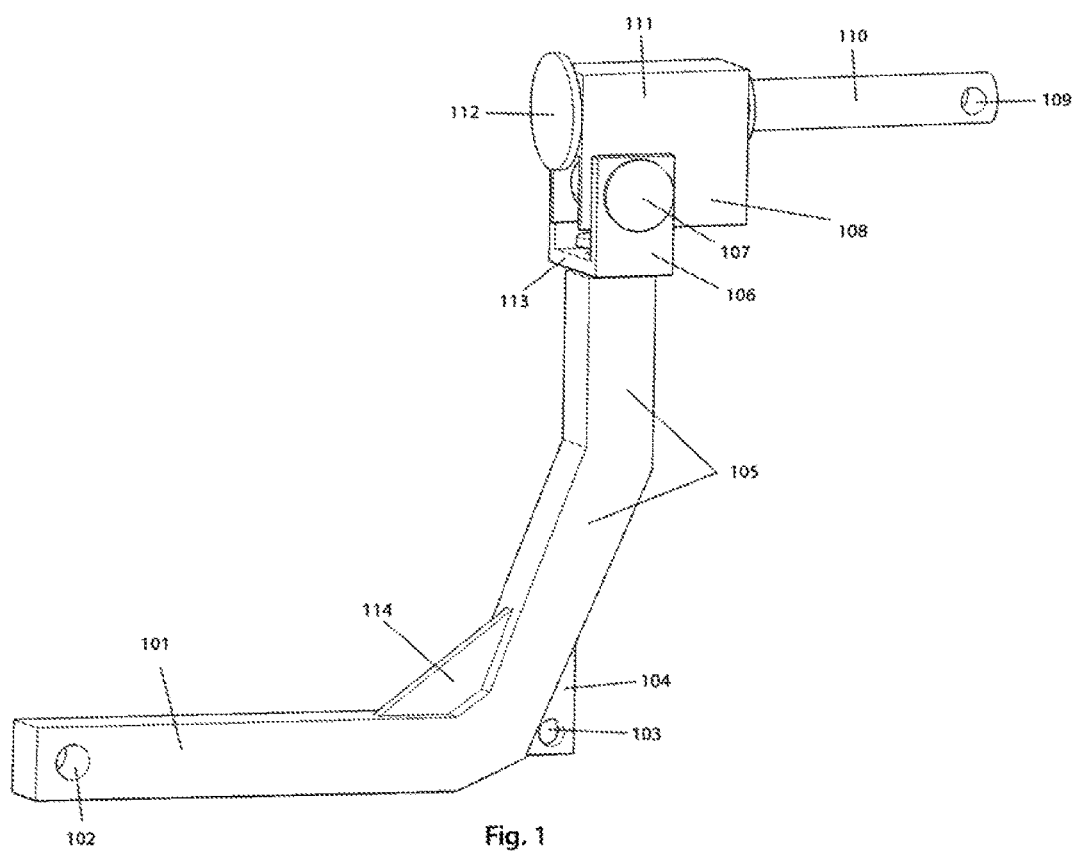
FIG. 1 shows a side perspective of the attachment mechanism of the present invention.
Figure 2:
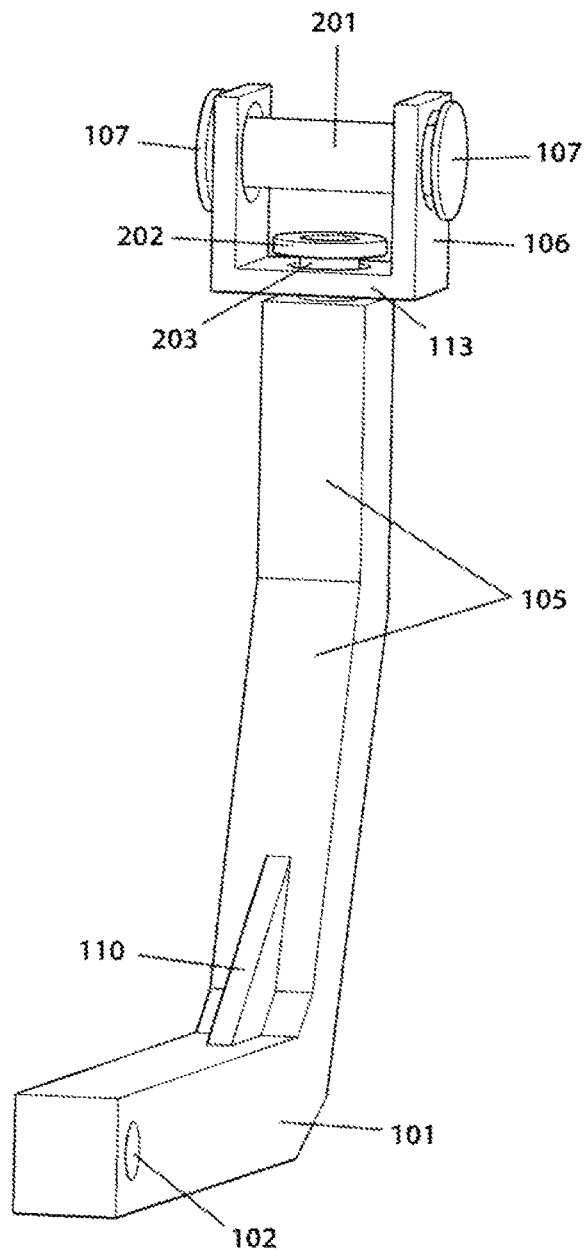
FIG. 2 shows a rear perspective of the lower portion of the attachment mechanism from the stinger which slides into a vehicle receiver to the hinge joint.
Figure 3:
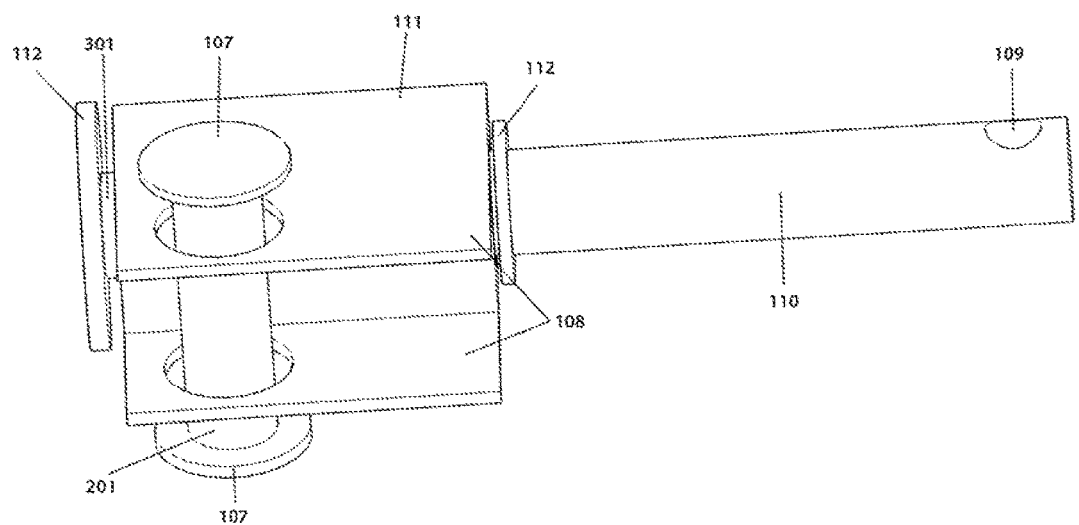
FIG. 3 shows a bottom perspective of the upper portion of the attachment mechanism from the hinge joint to the stinger which slides into a trailer receiver.
Figure 4:
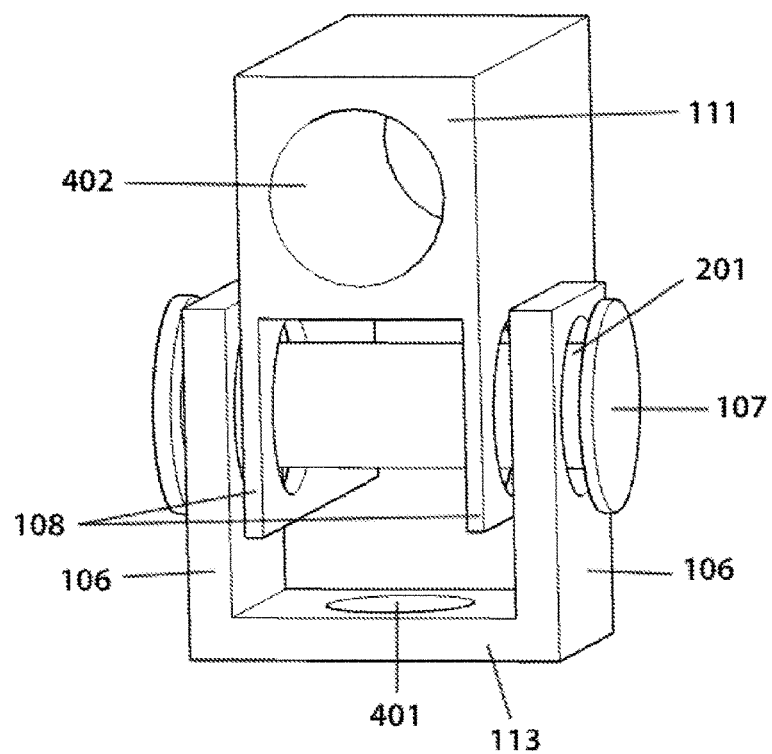
FIG. 4 shows a perspective view of the hinge formed by the yokes attached to the revolute joints and a pin.

The invention is a mechanism for attaching a vehicle to a trailer with particular application to all-terrain vehicles. The mechanism comprises two revolute joints connected by a hinge joint.

As used in this application, a revolute joint is defined as a pin passing through a knuckle. The pin is configured with two flanges, one on each end of the knuckle. The flanges prevent the pin from sliding in or out of the knuckle beyond the flanges. The pin is configured to rotate freely within the knuckle.

As used in this application, a yoke is defined as two approximately parallel surfaces connected to each wherein the approximately parallel surfaces contain co-linear holes.

As used in this application, a pin is defined as a, typically cylindrical, rod which passes through the knuckle of a hinge and around which the knuckle rotates.

As used in this application, a knuckle is defined as the hollow portion creating the joint of the hinge through which the pin is set.

As used in this application, a stinger is defined as a male member having a length greater than width or height and configured to be reversibly installed into, and be removed from, a female receptacle having an opening configured to accept the male member when inserted or removed lengthwise.

The invention comprises a vehicle attachment means configured for attaching the mechanism to a vehicle. In a preferred embodiment, the vehicle attachment means comprises a stinger 101 configured to be inserted into, and attached to, a receiver attached to a vehicle. When the vehicle attachment means is a stinger 101, the stinger is preferably configured with a hole 102 so the stinger can be secured to the vehicle. The invention further comprises a substantially vertical member 105 which extends substantially vertically from vehicle attachment means. If necessary to provide structural support, the connection between the vehicle attachment means and the vertical member may be reinforced 114. The invention further comprises a vertical revolute joint at the end of the substantially vertical member. The vertical revolute joint is comprised of a pin 203, a knuckle 113, and flanges 202 (one of which may be vertical member 105). Knuckle 113 contains a hole 401 configured for the passage of pin 203 of the vertical revolute joint. The invention further comprises a yoke 106 which is attached to the knuckle 113 of the vertical revolute joint. In a preferred embodiment, the yoke 106 extends beyond the end of the vertical revolute joint. In a preferred embodiment, the invention comprises a hole 103 in a surface 104 configured to attach a safety chain, the other end of which may preferably be attached to the vehicle, which may keep the trailer attached to the attachment mechanism if the stinger becomes detached from the receiver.

The invention further comprises a trailer attachment means. In a preferred embodiment, the trailer attachment means comprises a stinger 110 configured to be inserted into, and attached to, a receiver attached to the trailer. When the trailer attachment means is a stinger 110, the stinger 110 is preferably configured with a hole 109 so the stinger 110 can be secured to the trailer. The invention further comprises a generally horizontal revolute joint attached to the trailer attachment means. The horizontal revolute joint is comprised of a pin 301, a knuckle 111, and flanges 112. The invention further comprises a yoke 108 which is attached to the knuckle 111 of the horizontal revolute joint. In a preferred embodiment, the yoke 108 attached to the knuckle 111 of the horizontal revolute joint does not extend beyond the end of the horizontal revolute joint.

The invention further comprises one or more pins 201 pivotally connecting the yoke 108 attached to the knuckle 111 of the horizontal revolute joint to the yoke 106 attached to the knuckle 113 of the vertical revolute joint forming a pivot joint. Knuckle 111 contains a hole 402 configured for the passage of pin 201 of the horizontal revolute joint. Yoke 106 attached to the vertical revolute joint and the yoke 108 attached to the horizontal revolute joint comprise knuckles of a hinge when connected by one or more pins 107.

The length of the vehicle attachment means is selected such that the vertical member does not contact the vehicle when the vehicle attachment means is attached to the vehicle. In a preferred embodiment, the vehicle attachment means is approximately one foot long.

The length of the vertical member, including the vertical revolute joint and yoke, is selected such that the top of the yoke is slightly lower than the seat of the vehicle to which the mechanism will be attached. In a preferred embodiment, the vertical member, including the vertical revolute joint and yoke, is approximately two feet high and angles slightly away from the vehicle.

The length of the trailer attachment means, including the horizontal revolute joint and yoke, is selected such that the front of the trailer is sufficiently behind the trailer when the trailer is on an upward incline and the vehicle is on a downward incline, the front of the trailer does not contact the rear of the vehicle over a wide range of uneven ground. The length of the trailer attachment means is also selected such that the neck of the trailer, rather than the body of trailer, limits the turning radius when the trailer is attached to the vehicle using the mechanism.

The invention provides a number of desirable features. The vertical revolute joint permits a minimal turning radius. The horizontal revolute joint permits unencumbered rotational freedom of the trailer relative to the vehicle. The hinge joint permits the trailer and the vehicle to be on different planes, such as traveling down into or over the top of Kelly humps. The relatively high attachment point, in conjunction with the angled (or, alternatively goose neck) tongue on the trailer, permits small angles between the trailer and vehicle without binding. The goose-neck connecting the joints to the trailer permit large reflex angles between the trailer and vehicle without binding.

The invention claimed is:

1. An article of manufacture for attaching a vehicle to a trailer comprising:
   a vehicle attachment means;
   a vertical member attached to the vehicle attachment means which extends upward from the vehicle attachment means when the vehicle attachment means is attached to a vehicle;
   a vertical revolute joint attached to the vertical member;
   a yoke attached to the knuckle of the vertical revolute joint;
   a trailer attachment means;
   a horizontal revolute joint attached to the trailer attachment means;
   a yoke attached to the knuckle of the horizontal revolute joint; and
   one or more pins connecting the yoke attached to the vertical revolute joint to the yoke attached to the horizontal revolute joint.

2. The article of manufacture of claim 1 wherein the yoke attached to the knuckle of the vertical revolute joint extends away from the vertical member.

3. The article of manufacture of claim 2 wherein the yoke attached to the knuckle of the horizontal revolute joint extends perpendicular to the pin of the revolute joint.

4. The article of manufacture of claim 3 wherein the vehicle attachment means is a stinger.

5. The article of manufacture of claim 4 wherein the vehicle attachment means is configured with a hole passing perpendicularly through the vehicle attachment means configured to cooperatively couple with a hole in a receptacle attached to a vehicle such that the vehicle attachment means can be secured into the receptacle.

6. The article of manufacture of claim 3 wherein the trailer attachment means is a stinger.

7. The article of manufacture of claim 6 wherein the trailer attachment means is configured with a hole passing perpendicularly through the trailer attachment means configured to cooperatively couple with a hole in a receptacle attached to a trailer such that the trailer attachment means can be secured into the receptacle.

8. The article of manufacture of claim 3 wherein the vehicle attachment means is a receptacle configured to cooperatively couple with a stinger attached to a vehicle.

9. The article of manufacture of claim 8 wherein the vehicle attachment means is configured with a hole passing perpendicularly through the vehicle attachment means configured to cooperatively couple with a hole in a stinger attached to a vehicle such that the stinger can be secured into the vehicle attachment means.

10. The article of manufacture of claim 3 wherein the trailer attachment means is a receptacle configured to cooperatively couple with a stinger attached to a trailer.

11. The article of manufacture of claim 10 wherein the trailer attachment means is configured with a hole passing perpendicularly through the trailer attachment means configured to cooperatively couple with a hole in a stinger attached to a trailer such that the stinger can be secured into the trailer attachment means.

* * * * *